United States Patent [19]

Hatakenaka

[11] Patent Number: 4,688,949
[45] Date of Patent: Aug. 25, 1987

[54] HIGH SPEED RESPONSE TEMPERATURE SENSOR

[75] Inventor: Tsukasa Hatakenaka, Nagaokakyo, Japan

[73] Assignee: Omron Tateisi Electronics Co., Kyoto, Japan

[21] Appl. No.: 880,819

[22] Filed: Jul. 1, 1986

[30] Foreign Application Priority Data

Jul. 5, 1985 [JP] Japan ................. 60-147682

[51] Int. Cl.$^4$ .................... G01K 1/14; G01K 1/18
[52] U.S. Cl. ...................... 374/183; 338/28; 374/208
[58] Field of Search ............ 374/183, 102, 103, 104, 374/208; 338/158, , 42, 22, 28

[56] References Cited

U.S. PATENT DOCUMENTS

| 3,593,581 | 7/1981 | Beightol | 374/185 |
|---|---|---|---|
| 3,643,200 | 2/1972 | Brandi | 338/258 |
| 3,668,373 | 6/1972 | Laing | 374/185 X |
| 4,001,586 | 1/1977 | Fraioli | 374/183 X |
| 4,317,367 | 3/1982 | Schonberger | 374/185 X |
| 4,349,958 | 9/1982 | Hakansson et al. | 374/185 X |
| 4,411,535 | 10/1983 | Schwarzschild | 374/185 X |
| 4,447,884 | 5/1984 | Wada | 374/102 |
| 4,527,909 | 7/1985 | Dale et al. | 374/208 X |

Primary Examiner—Daniel M. Yasich
Attorney, Agent, or Firm—Wegner & Bretschneider

[57] ABSTRACT

In this high speed response type temperature sensor, a base body member is formed as a hollow tube with one closed end and one open end, and a temperature sensitive sensor layer is formed over at least part of its external surface. An electrode layer is arranged at at least a part of the periphery of the open end of the base body member, in contact with a part of the temperature sensitive sensor layer, and a protective cover layer is formed over at least a part of the sensor layer. Thus, since this sensor layer is formed on the external surface of the hollow tubular base body member, the opposing and contacting area between the sensor layer and the object whose temperature is to be measured becomes relatively large, and the distance therebetween is also reduced, so that the efficiency of heat conduction from the object to the sensor layer is greatly improved. Because the base body member is hollow, also, the overall heat capacity is greatly reduced. Accordingly, good and quick response of this temperature sensor are obtained, and accuracy is improved. Further, this sensor is relatively easy and cheap to manufacture.

2 Claims, 6 Drawing Figures

HIGH SPEED RESPONSE TEMPERATURE SENSOR

BACKGROUND OF THE INVENTION

The present invention relates to a temperature sensor which is capable of a high speed response for measuring temperature, and more particularly relates to such a temperature sensor which is particularly suitable for use in an electronic clinical thermometer.

Nowadays, for use for thermometric purposes such as clinical thermometry, electronic thermometers have been developed. Such an electronic thermometer makes use of changes in the electrical resistance of a temperature sensor which are caused by changes in the ambient temperature, and measure such electrical resistance changes by using an electronic circuit which displays a visible indication to the user indicative of the current temperature of said temperature sensor. These types of electronic thermometers have many advantages over the conventional type of mercury thermometer which makes use of the thermal expansion of liquid mercury for providing a temperature indication.

In such an electronic thermometer, the heat capacity of the temperature sensor which is brought into direct contact with the patient's body or other element of which temperature is to be sensed is an important factor which determines the time required for achieving an accurate temperature measurement. Specifically, the greater is the heat capacity of the temperature sensor, the more time is required before said temperature sensor comes to be in thermal equilibrium with the patient's body or other element of which temperature is to be sensed, and accordingly the longer a time is required before a proper temperature reading can be obtained.

Accordingly, it is desirable for the heat capacity of the temperature sensor to be reduced as much as practicable, in order to achieve as accurate temperature measurement as possible and to reduce the time required for obtaining such accurate temperature measurement. However, according to a conventional internal structure for a conventional such temperature sensor, as shown in longitudinal cross sectional view in FIG. 6 of the accompanying drawings, a metallic cap denoted by the reference numeral 52 and formed of aluminum or the like is attached to the end of a protrusion 51 of the main body casing of the thermometer, while a temperature sensitive sensor element 53 is disposed in a substantially central position within said metallic cap 52, with an adhesive filling material mass 54 such as epoxy resin is filled into said metallic cap 52 so that the protrusion 51 and the metallic cap 52 may be well and soundly bonded together by this adhesive agent mass 54 which also serves to envelop and supportingly receive the temperature sensitive sensor 53.

According to this conventional form of construction, it may occur that the temperature conduction between the metallic cap 52 and the temperature sensitive sensor 53 is unduly deteriorated by the presence of the adhesive and filling agent 54 which inevitably is introduced therebetween. Additionally, the quantity of this adhesive and filling agent 54 may become so great that the overall heat capacity of the temperature sensor may become excessively high, with the result that an excessive time is taken for attaining a stable indication of temperature, and high speed temperature measurement cannot be performed.

SUMMARY OF THE INVENTION

Accordingly, it is the primary object of the present invention to provide a high speed response type temperature sensor, which avoids the problems detailed above.

It is a further object of the present invention to provide such a high speed response type temperature sensor, which has a relatively low heat capacity.

It is a further object of the present invention to provide such a high speed response type temperature sensor, which is not prone to high thermal conduction resistance occurring between its sensor element portion and a body whose temperature is to be measured.

It is a yet further object of the present invention to provide such a high speed response type temperature sensor, which can provide a high speed of response.

It is a yet further object of the present invention to provide such a high speed response type temperature sensor, which allows the opposing and contacting area between the temperature sensitive sensor portion thereof and the object whose temperature is to be measured to become relatively very large.

It is a yet further object of the present invention to provide such a high speed response type temperature sensor, which allows the distance between the temperature sensitive sensor portion thereof and the object whose temperature is to be measured to be minimized.

It is a yet further object of the present invention to provide such a high speed response type temperature sensor, with which the efficiency of heat conduction from the object whose temperature is to be measured to the temperature sensitive sensor layer is improved.

It is a yet further object of the present invention to provide such a high speed response type temperature sensor, which can provide as accurate temperature measurement as possible.

It is a yet further object of the present invention to provide such a high speed response type temperature sensor, which can satisfactorily reduce the time required for obtaining such accurate temperature measurement.

It is a yet further object of the present invention to provide such a high speed response type temperature sensor, which can be manufactured cheaply and effectively.

According to the most general aspect of the present invention, these and other objects are attained by a high speed response type temperature sensor, comprising: (a) a base body member, formed as a hollow tube with one closed end and one open end; (b) a temperature sensitive sensor layer formed over at least part of the external surface of said hollow tubular base body member; (c) an electrode layer arranged at at least a part of the periphery of said open end of said hollow tubular base body member, in contact with a part of said temperature sensitive sensor layer; and: (d) a protective cover layer formed over at least a part of said temperature sensitive sensor layer.

In this high speed response type temperature sensor, since the temperature sensitive sensor layer is formed over at least part of the external surface of the hollow tubular base body member, thereby the opposing and contacting area between said temperature sensitive sensor layer and the object whose temperature is to be measured becomes relatively very large, and the distance therebetween is also reduced, so that thereby the efficiency of heat conduction from the object whose temperature is to be measured to the temperature sensitive sensor layer is very greatly improved, as compared to the prior art. Also, because the tubular base body member is hollow, the overall heat capacity of the temperature sensor is greatly reduced. Accordingly, good and quick response of this high speed response type temperature sensor are obtained, and accuracy is improved. Further, this temperature sensor is relatively easy to manufacture, and is relatively inexpensive.

Further, according to particular specializations of the present invention, the above specified and other objects are more particularly attained by a high speed response type temperature sensor as specified above, wherein said protective cover layer is further formed over at least a part of said electrode layer; or wherein said electrode layer is arranged to extend from the external surface of said hollow tubular base body member to the internal surface thereof.

BRIEF DESCRIPTION OF THE DRAWINGS

The present invention will now be described with respect to the preferred embodiments thereof, and with reference to the illustrative drawings appended hereto, which are provided for the purposes of explanation and exemplification only, and are not intended to be limitative of the scope of the present invention in any way. With relation to the figures, spatial terms are to be understood as referring only to the orientation on the drawing paper of the illustrations of the relevant parts, unless otherwise specified, and.

DESCRIPTION OF THE PREFERRED EMBODIMENTS

The present invention will now be described with reference to the preferred embodiments thereof, and with reference to the figures.

THE FIRST PREFERRED EMBODIMENT

Figure 1:
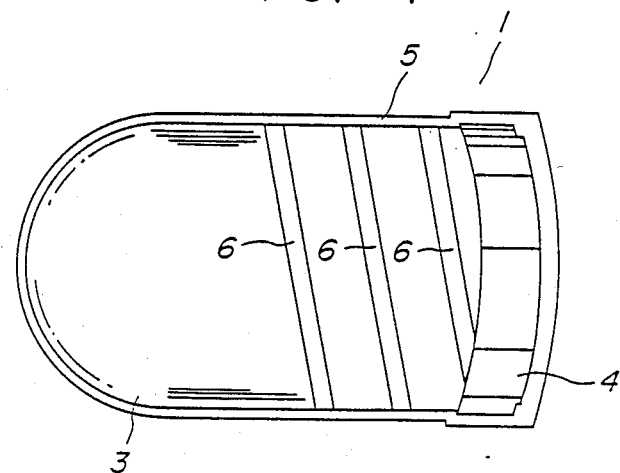
FIG. 1 is an external side view showing the first preferred embodiment of the high speed response type temperature sensor of the present invention.
Figure 2:
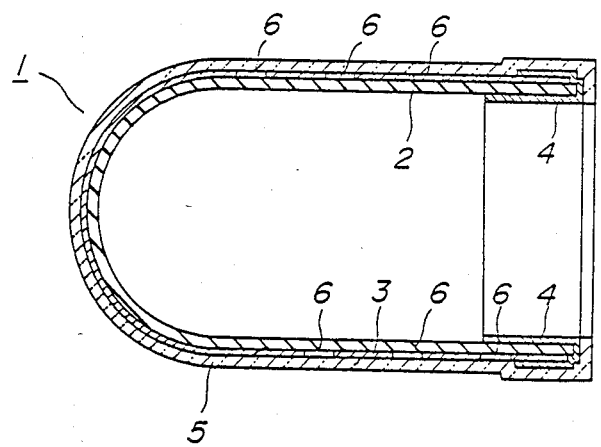
FIG. 2 is a longitudinal sectional view taken through said first preferred embodiment temperature sensor.

In the first preferred embodiment of the high speed response type temperature sensor of the present invention, the sensor as a whole is denoted by the reference numeral 1, and is shown in an external side view in FIG. 1 and in longitudinal sectional view in FIG. 2. This sensor 1 has a base body member 2 which is formed in the general shape of a cylinder with its one end closed by a portion formed in the general shape of a hemisphere and with its other end open, and a thermistor (temperature sensitive sensor) layer 3, which may be made of Mo-Co-Ni-Al oxide paste, is formed as a layer over the external surface of said base body member 2. Electrodes 4, which may be made of Ag paste, are each of them formed into a layer extending from the outer surface of the open end of the base body member 2 to the inner surface of said open end thereof, while making contact with the thermistor material 3. And an insulating and water proofing resin coating layer 5, which may be made of a hard plastic type material such as epoxy resin, is laid over the portions of the thermistor layer 3 and of the electrodes 4 which oppose the outer surface of the base body member 2. The thermistor layer 3 is formed, as best shown in FIG. 1 which shows said thermistor layer 3 as seen through the resin coating layer 5, with trimming grooves 6 as will be described hereinafter.

The particular details of this first preferred embodiment construction will now be explained in more detail.

The base body member 2 is typically made by forming, by a dry forming process, a quantity of high purity type alumina powder into the shape of a preform cylinder with its one end closed by a portion formed in the general shape of a hemisphere and with its other end open, by then baking this preform cylinder in air at a temperature of from about 1500° C. to about 1600° C., and by then smoothing the surface of the resultant body by a barrel grinding process.

The thermistor layer 3 is typically formed as follows. Specifically, after a mixture of Mo-Co-Ni-Al oxides is appropriately produced at a certain appropriate composition, and is initially provisionally baked at a temperature of approximately 1000° C., this provisionally baked powder is ground up and pulverized into particles of less than about 1 micron in diameter. Then a quantity of an organic binder such as glycerin, butyl alcohol, or the like is added to the pulverized provisionally baked powder, so as to prepare a thermistor paste, and this paste is then printed (i.e., is formed into a layer) over the external surface of the base body member 2, as by a screen printing process. The amount of the thermistor paste to be so applied is determined so that the thickness of the thermistor layer 3, after again being baked as will shortly be described, is approximately 10 microns. And then, after this layer of thermistor paste has dried, the base body member 2 with the thermistor paste applied thereover are together baked in air at a temperature of from about 700° C. to about 900° C., and this completes the formation of the thermistor layer 3.

And the electrodes 4 are typically formed by applying a layer of Ag paste by a screen printing process and by then fixing this layer in air at a temperature of from about 700° C. to about 800° C.

When the formation of the electrodes 4 is thus completed, the thermistor 3 is adjusted by a laser trimming process until its resistance comes to be approximately equal to a particular determinate resistance value. At this time, the trimming grooves 6 are formed. An epoxy insulating and water proofing resin layer is then coated over the external surface of the thus obtained preform to a thickness of approximately 10 microns by a spinner, and is then dried to form the insulating and water proofing resin coating layer 5 described earlier, thus to finish the production of the sensor 1. Typically, such a sensor 1 may be about 3 mm in diameter and about 8 mm in length.

Figure 3:
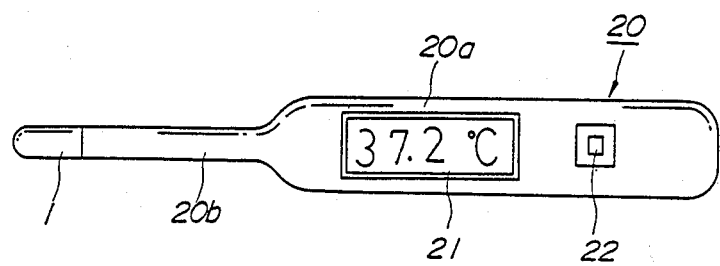
FIG. 3 is a side view showing the temperature sensor of FIGS. 1 and 2 as incorporated in an electronic clinical thermometer.
Figure 4:
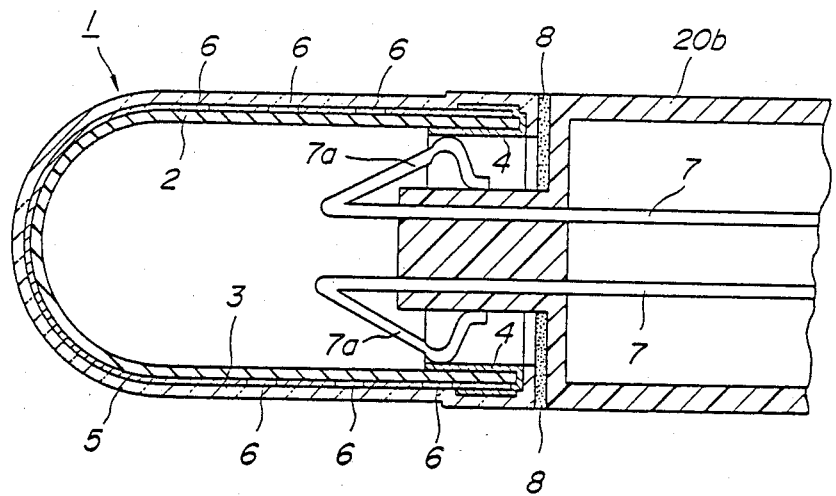
FIG. 4 is a longitudinal cross sectional view showing the structure by which said high speed response type temperature sensor is attached to said electronic clinical thermometer.

FIG. 3 shows in side view how this sensor 1 can be incorporated in an electronic clinical thermometer 20, while FIG. 4 shows in longitudinal cross section the structure by which said sensor 1 is attached to said electronic clinical thermometer 20. The electronic clinical thermometer 20 shown in these drawings is of a per se known type which incorporates an A/D converter, a micro computer, and so on (none of these being particularly shown) in a case main body 20a, and which further incorporates as arranged on its exterior surface a display unit 21 which may be of the LCD (liquid crystal display) type, for indicating a numerical value corresponding to patient body temperature, and also a push button type power switch 22 and the like.

The sensor 1 is fixedly secured to the free end of a protrusion 20b which projects from the end of the case main body 20a of the electronic clinical thermometer 20. According to this particular construction, the A/D converter, not particularly shown in the drawings, and the thermistor layer 3 are connected together by a pair of lead wires 7, 7, by way of the electrodes 4 which are directly connected to the thermistor layer 3. In more detail, the lead wires 7, 7 are made of a metal such as phosphor bronze, and their end portions 7a are bent so as to form clip contact portions which are biased towards and against the electrodes 4 by spring force due to their own resilience. According to this, the electronic clinical thermometer 20 is built in such a manner that simply connecting the sensor 1 to the end portion of the protrusion 20b projecting from the end of its case main body 20a causes the end portions 7a of the lead wires 7 to be pressed against the electrodes 4, so that the thermistor layer 3 and the A/D converter (not particularly shown) are electrically connected. The sensor 1 is in fact bonded to said end portion of the protrusion 20b by a layer of adhesive agent 8.

According to this first preferred embodiment of the high speed response type temperature sensor of the present invention, the layers formed on the base body member 2 are generally thicker than in the case of the second preferred embodiment to be described shortly. Specifically, in this first preferred embodiment, the layers constituting the thermistor layer 3, the electrodes 4, and the insulating and water proofing resin coating layer 5 are generally about 10 microns in thickness.

THE SECOND PREFERRED EMBODIMENT

Figure 5:
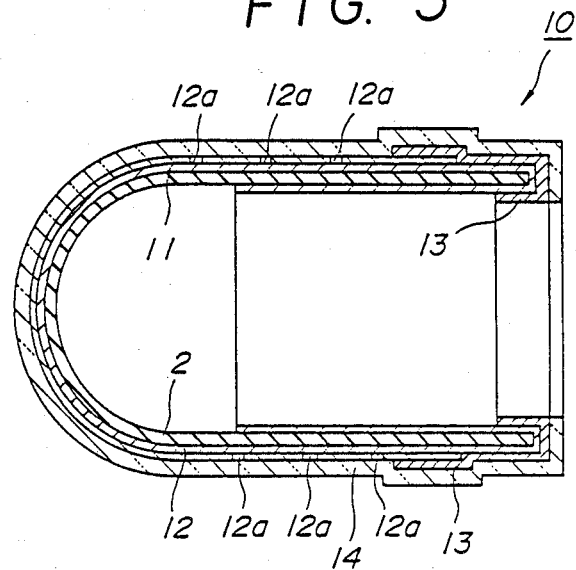
FIG. 5 is a longitudinal sectional view, similar to FIG. 2 relating to the first preferred embodiment, taken through the second preferred embodiment of the high speed response type temperature sensor of the present invention.
Figure 6:
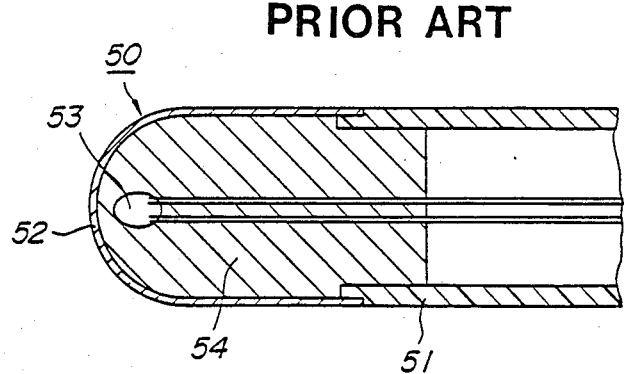
FIG. 6 is a longitudinal sectional view, similar to FIG. 4 relating to the first preferred embodiment, taken through a prior art type conventional temperature sensor.

The second preferred embodiment of the cylinder head of the present invention is shown in FIG. 5, in a similar manner to FIG. 2 relating to the first preferred embodiment. In this second preferred embodiment of the high speed response type temperature sensor of the present invention, generally denoted in the figure by the reference numeral 10, by contrast with the first preferred embodiment disclosed above, a layer constituting a thermistor layer 12 is generally about 1 micron in thickness, while layers constituting electrodes 13 and a thin film protective insulating layer 14 are generally about 5 microns in thickness. Also, this second preferred embodiment differs from the first prefered embodiment disclosed above, in that a glass coating layer 11 is formed over the external surface of the base body member 2, which is otherwise formed in substantially the same way as in said first preferred embodiment, for the purpose of even further smoothing the external surface of said base body member 2; and the compositions and the thicknesses of the thermistor layer and of the other layers are different. Specifically, except for the glass coating layer 11, the thermistor 12, the electrodes 13, and the protective insulating film layer 14 are laminated in substantially same manner as in the first preferred embodiment explained above.

In detail, now the manufacturing process for this second preferred embodiment will be described. After the base body member 2 is formed in substantially substantially the same manner as in the first preferred embodiment explained above, the glass coating layer 11 is formed over the external surface of said base body member 2. Then, the thermistor layer 12 is formed over the external surface of said base body member 2, and has an upper glass coating layer 11 (referred to as an alumina cap hereinafter) by performing a reactive sputtering process, using a target made of Ta, Zr, or the like, and by supplying Ar, $N_2$, or $O_2$ gas in a vacuum device, and the workpiece is heated up to a temperature of from about 300° C. to about 400° C. in order to increase the stability of the thermistor layer 12, which is approximately 1 micron in thickness. Thereafter, for the purpose of even further stabilizing the thermistor layer 12, the alumina cap 11 is annealed in a vacuum of about $10^{-4}$ torr or greater. This annealed alumina cap is termed a sensor element.

The electrodes 13 are formed over the surface of this sensor element by depositing a layer of metal such as Au, Ag, or the like thereonto in vacuum, and an ohmic contact is achieved between the thermistor 12 and the electrodes 13 by heating the sensor element up to a temperature of about 400° C. Then, a desired pattern for the electrodes 13 which is necessary for producing proper parameters for the sensor element is formed by conducting appropriate photo resist processing, and any unnecessary electrode layer is eliminated by a dry or a wet etching process. The photo resist pattern is also eliminated.

After then adjusting the thermistor 12 by a laser trimming process until its resistance comes to be approximately equal to a particular determinate resistance value, at which time the trimming grooves 12a similar to the grooves 6 of the first preferred embodiment are formed, a protective insulating and water proofing resin layer 14 is then coated over the external surface of the thus obtained preform by performing a reactive sputtering process using a target made of Si, Al, or the like, and by supplying Ar and/or $N_2$ gas in a vacuum device, thus to finish the production of the sensor 10 of this second preferred embodiment.

CONCLUSIONS

Thus, in this high speed response type temperature sensor, since the temperature sensitive sensor layer is formed over at least part of the external surface of the hollow tubular base body member, thereby the opposing and contacting area between said temperature sensitive sensor layer and the object whose temperature is to be measured becomes relatively very large, and the distance therebetween is also reduced, so that thereby the efficiency of heat conduction from the object whose temperature is to be measured to the temperature sensitive sensor layer is very greatly improved as compared to the prior art. Also, because the tubular base body member is hollow, the overall heat capacity of the temperature sensor is greatly reduced. Accordingly, good and quick response of this high speed response type temperature sensor are obtained, and accuracy is improved. Further, this temperature sensor is relatively easy to manufacture, and is relatively inexpensive.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A high speed response type temperature sensor, comprising:
    (a) a base body member formed as a hollow tube with at least one closed end and at least one open end;
    (b) a temperature sensitive sensor layer formed over at least part of the external surface of the hollow tubular base body member;
    an elctrode layer on at least a part of the periphery of the open end of the hollow tubular base body member and on at least a part of the temperature sensitive sensor layer, where the electrode layer is in contact with a part of the temperature sensitive sensor layer, the electrode layer is arranged to extend from a selected point on the external surface of the hollow tubular base body member to a preselected distance on the internal surface thereof so that at least a part of the inner portion of the electrode layer can be mechanically and electrically connected to at least one lead wire; and
    (d) a protective cover layer formed over at least a part of the temperature sensitive sensor layer.

2. A high speed response type temperature sensor according to claim 1, wherein said protective cover layer is further formed over at least a part of said electrode layer.

* * * * *